UNITED STATES PATENT OFFICE.

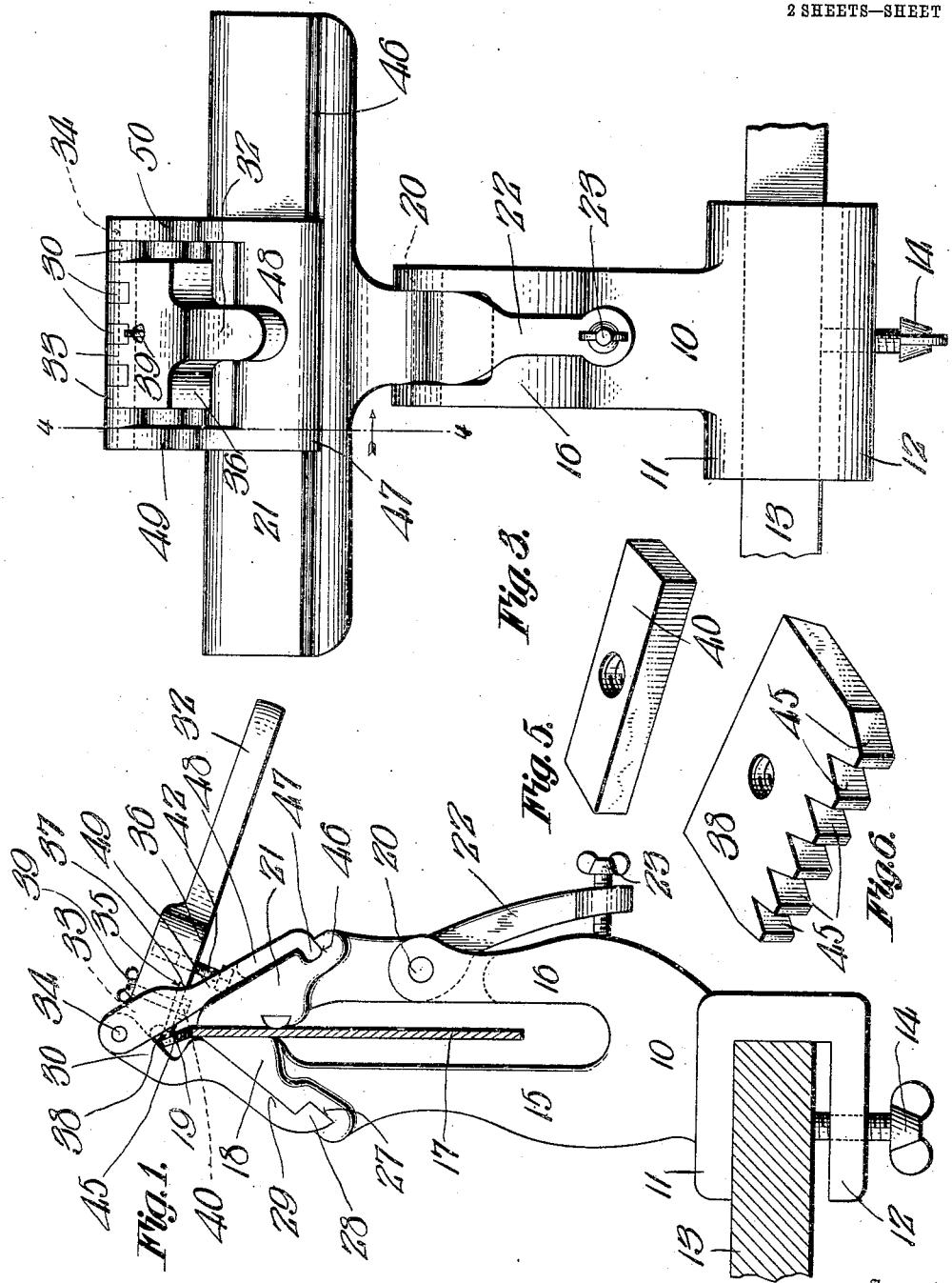

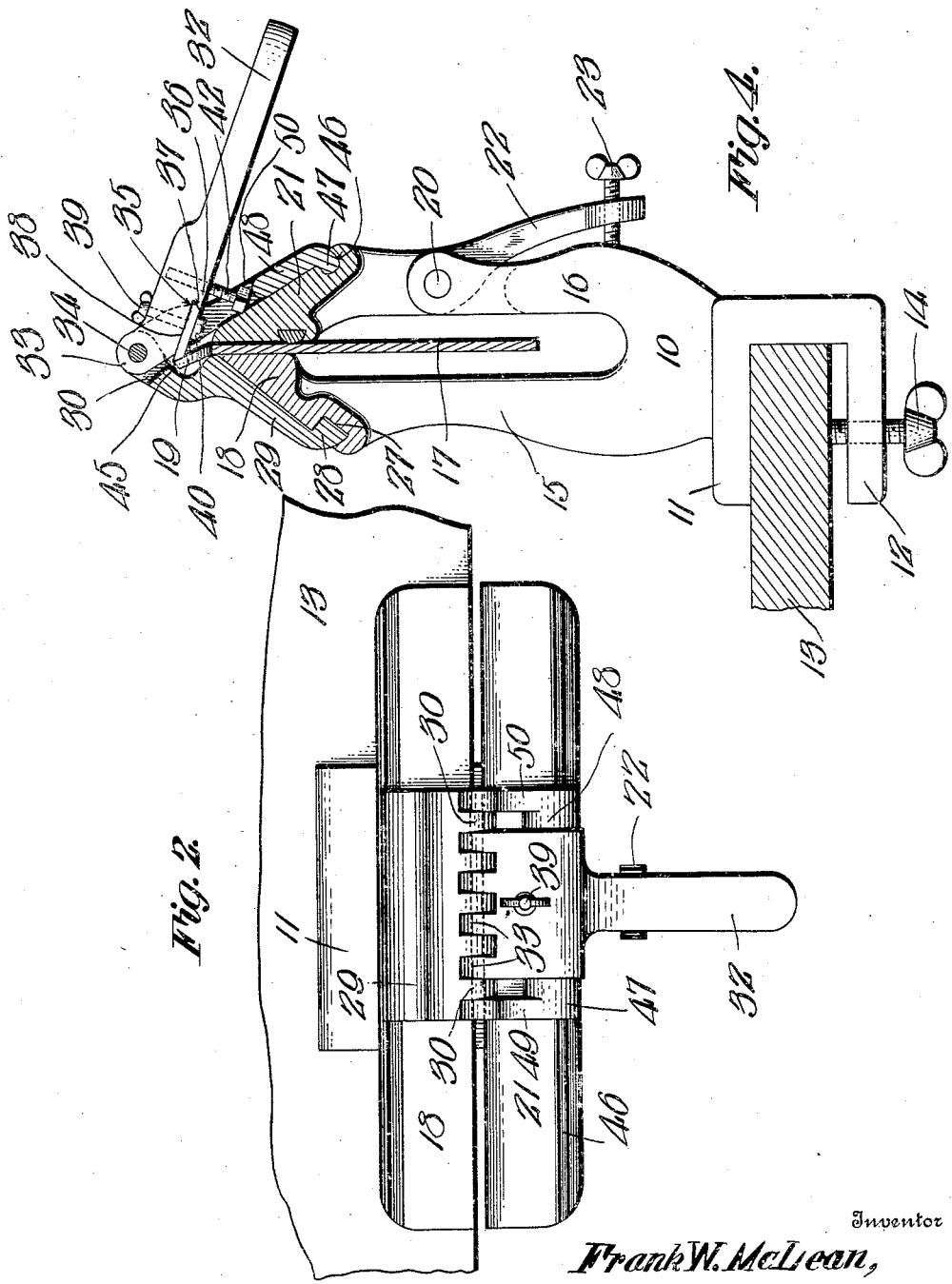

FRANK W. McLEAN, OF SHREVEPORT, LOUISIANA.

SAW SET AND CLAMP.

No. 931,076.   Specification of Letters Patent.   Patented Aug. 17, 1909.

Application filed December 1, 1908. Serial No. 465,511.

*To all whom it may concern:*

Be it known that I, FRANK W. MCLEAN, a citizen of the United States, residing at Shreveport, in the parish of Caddo, State of Louisiana, have invented certain new and useful Improvements in Saw Sets and Clamps; and I do hereby declare the following to be a full, clear, and exact description of the invention, such as will enable others skilled in the art to which it appertains to make and use the same.

This invention relates to implements for clamping saws while being filed, and also for setting the teeth of the saw subsequently to or after the filing as may be preferred, and has for one of its objects to simplify and improve the construction and increase the efficiency and utility of devices of this character.

Another object of the invention is to provide a simply constructed device whereby a saw may be clamped in position for the filing operations and with a "setting" attachment whereby the teeth may be set without detaching the saw from the clamping mechanism.

With these and other objects in view the invention consists in a clamping device in which the saw is firmly held in position for filing and a setting attachment detachably connected to the clamping mechanism, whereby the teeth may be set without removing the saw from the clamping mechanism.

The invention further consists in certain novel features of construction as hereafter shown and described and specifically pointed out in the claim, and in the drawings illustrative of the preferred embodiment of the invention, Figure 1 is an end elevation of the improved device with a saw blade disposed therein and with a setting mechanism applied to the teeth. Fig. 2 is a plan view of the same. Fig. 3 is a front elevation of the improved device. Fig. 4 is a section on the line 4—4 of Fig. 3. Fig. 5 is a perspective view of the hammer plate holding bar, detached. Fig. 6 is a perspective view of the hammer plate, detached.

The improved device comprises a standard 10 having means for attachment to a stationary support, this means preferably being spaced jaws 11—12 for bearing upon opposite sides of a table or bench 13 and with a clamp screw 14 operating through one of the jaws and bearing beneath the bench, as shown.

The standard 10 is divided into two arms 15—16 between which the rear side of the saw blade, represented at 17, is disposed. The upper end of the arm 15 is enlarged at 18 into a laterally extending jaw against which the saw blade bears with its teeth 19 extending above the upper edges of the jaw. Swinging at 20 from the upper end of the arm 16 is another jaw 21 and bearing against the opposite side of the saw, the two jaws 18—21 forming the clamp or vise elements of the device and which support the saw in position for the filing action, as hereafter explained.

The jaw 21 is provided with an integral lever arm 22, through which a set screw 23 operates and bears against the arm 16, to force the free edge of the jaw 21 firmly against the saw. By this simple means it will be obvious that the saw blade is firmly clamped from movement vertically and held in proper position for the filing action.

Formed in the outer lower face of the jaw 18 is a groove or seat 27 and extending the whole length of the jaw, and in which a guide rib 28 on a supporting member or plate 29 engages, the plate having spaced arms 30.

Formed in the outer lower face of the jaw 21 is a groove or seat 46 dovetailed and extending the whole length of the jaw, and in which a guide rib 47 on a supporting member or plate 48 engages, the plate having spaced arms 49—50 bearing upon the outer faces of the outer lugs 30 of the member 29 and to which they are swingingly coupled by a pintle 34.

The two members 29—48 are slidably arranged upon the jaws 18—21, and may be moved together from end to end of the jaws, the dovetailed grooves or guideways and the guide ribs coacting to support the members in position, while the hinge joint by which they are connected permit them to be adapted to the adjustments of the jaws 18—21.

An operating lever 32 forms a part of the setting mechanism and is provided with a plurality of spaced ears 33 conforming to and adapted to engage between the ears 30 of the member 29, and between the arms 49—50 and coupled by the pintle 34. By this means the lever 32 is swingingly coupled to the hinge member 29.

Formed in the inner face of the lever 32 is a recess 35 and a projection 36, the inner end of the recess next to the projection 36 being inclined as shown at 37.

Disposed within the recess 35 is a plate 38 which forms the "hammer" portion of the setting mechanism and is detachably connected to the lever 32 by a clamp bolt 39 having a bar 40 bearing beneath the plate, the inner end of the plate engaging against the inclined surface 37, as shown. The die 38 is formed with a plurality of spaced teeth 45 corresponding to the teeth of the saw, the teeth corresponding preferably to every other tooth of the saw.

Operating in the projection 36 of the lever 32 is a threaded stop pin 42 to bear against the adjacent face of the jaw 21 and thus limit the movement of the lever 32 as hereafter explained.

With a device thus constructed the operation is as follows:—The saw blade being inserted between the arms 15—16 is clamped therein by operating the set screws 23 with the teeth 19 arranged in proper position relative to the upper edges of the jaws 18—21, so that the teeth may be filed, in the ordinary manner. When it is desired to set the teeth, the saw is adjusted to bring the dies 45 of the plate 38 opposite a proper number of the teeth and the saw blade clamped between the jaws by operating the set screw 23 as before described. The plate 38 and the supporting pin 42 having been properly adjusted, the lever 32 is forcibly depressed to cause the dies 45 to bear against the teeth 19 with which for the time being they are engaged and thence bend those particular teeth over the upper edge of the jaw 18, and thus "set" the teeth. The setting mechanism is then adjusted to bring another set of the teeth in position and the operation repeated, and so on continuously until each alternate tooth has been set. The saw blade is then reversed in position and the setting action repeated upon the remaining alternate teeth.

The standard 10, arms 15—16, and the stationary jaw 18 are preferably formed integral and of steel or other suitable metal.

The plate 38 will be of hardened steel to enable it to withstand the severe strain to which it will be subjected.

The improved device is simple in construction, can be inexpensively manufactured and readily adapted without material structural changes to saw blades having various sizes of teeth.

While the construction shown in the drawings represents the preferred embodiment of the device, it will be understood that it is not desired to limit the invention specifically thereto as various changes therein may be made within the scope of the appended claims without departing from the principle of the invention or sacrificing any of its advantages.

What is claimed, is:—

In a device of the class described a stationary clamping jaw having a longitudinal dove-tailed guideway in its outer face, a movable clamping jaw having a longitudinal guideway in its outer face, a member movable on said stationary jaw and having a dove-tailed rib at one end movable in the guideways of the stationary jaw, a member movable upon said movable jaw and having a guide rib movable in the guideway of the same, spaced arms extending from said last mentioned member and hingedly united to said first mentioned member, a lever arm swingingly connected to said first mentioned member between said arms, and a die carried by said lever.

In testimony whereof, I affix my signature, in presence of two witnesses.

FRANK W. McLEAN.

Witnesses:
E. W. RUSSELL,
J. W. HAMILTON.